US012629813B1

(12) United States Patent
Ernst et al.

(10) Patent No.: US 12,629,813 B1
(45) Date of Patent: May 19, 2026

(54) TOOL ORGANIZER

(71) Applicant: ERNST MANUFACTURING, INC., Sandy, OR (US)

(72) Inventors: Gregory R Ernst, Eagle Creek, OR (US); Andrew Ernst, Sandy, OR (US); Dylan G Ernst, Eagle Creek, OR (US); Katy Sanchez, Sandy, OR (US); Josh Jury, Sandy, OR (US)

(73) Assignee: ERNST MANUFACTURING, INC., Sandy, OR (US)

(*) Notice: Subject to any disclaimer, the term of this patent is extended or adjusted under 35 U.S.C. 154(b) by 0 days.

(21) Appl. No.: 18/639,599

(22) Filed: Apr. 18, 2024

Related U.S. Application Data

(60) Provisional application No. 63/460,443, filed on Apr. 19, 2023.

(51) Int. Cl.
*B25H 3/06* (2006.01)
*B25H 3/02* (2006.01)

(52) U.S. Cl.
CPC ............... *B25H 3/06* (2013.01); *B25H 3/021* (2013.01)

(58) Field of Classification Search
CPC . B25H 3/003; B25H 3/04; B25H 3/06; B25H 1/0071
USPC ............ 211/70.6, DIG. 1, 13.1, 69; 206/350, 206/818, 493, 376; 248/309.4, 206.5, 248/311.2
See application file for complete search history.

(56) References Cited

U.S. PATENT DOCUMENTS

| | | | | | |
|---|---|---|---|---|---|
| 2,597,601 | A | * | 5/1952 | Sherman | A42B 1/24<br>224/183 |
| 4,114,241 | A | | 9/1978 | Bisping | |
| 4,406,368 | A | | 9/1983 | Hermes | |
| D286,933 | S | | 11/1986 | Lymburner | |
| 4,770,297 | A | | 9/1988 | Chang | |
| 5,036,975 | A | * | 8/1991 | Chow | B25H 3/04<br>312/902 |
| 5,217,115 | A | | 6/1993 | Purkapile | |
| 5,301,822 | A | * | 4/1994 | Coleman | B25H 3/04<br>211/DIG. 1 |
| 5,316,143 | A | * | 5/1994 | Horn | B25H 3/06<br>211/DIG. 1 |
| 5,456,359 | A | * | 10/1995 | Horn | B25H 3/06<br>211/DIG. 1 |
| 5,544,747 | A | * | 8/1996 | Hom | B25H 3/06<br>211/DIG. 1 |

(Continued)

OTHER PUBLICATIONS

Amazon , Pinoze, 42PCS Magnetic Modular Wrench Organizers for tool Drawers—Blank and Red—Wrench Rack with Mertic and SAE labels, Customizable Magnet Tool Storage Holder For Toolbox Organization, Dec. 24, 2024, https://a.co.d/cAZQpqB (Year: 2024) (Year: 2024).

*Primary Examiner* — Steven A. Reynolds
*Assistant Examiner* — Prince Pal
(74) *Attorney, Agent, or Firm* — patenttm.us

(57) ABSTRACT

A tool organizer provides a modular building block to allow assembly of organizers to hold multiple tools of a desired quantity. The organizers have a front tab that fits into a rearward receiver of another organizer to allow multiple organizers to be assembled together to make a multi-tool organizer block. The organizers employ tool receiving channels with curved profiles to allow tools placed therein to be aesthetically aligned for an ordered appearance.

13 Claims, 17 Drawing Sheets

(56) References Cited

U.S. PATENT DOCUMENTS

| | | | | | |
|---|---|---|---|---|---|
| 5,598,924 | A * | 2/1997 | McCann | B25H 3/06 | 206/372 |
| 5,669,516 | A * | 9/1997 | Horn | B25H 3/06 | 211/DIG. 1 |
| 5,743,394 | A * | 4/1998 | Martin | B25H 3/003 | 211/DIG. 1 |
| 5,855,285 | A * | 1/1999 | Laird | B25H 3/003 | 206/378 |
| 5,919,541 | A * | 7/1999 | Emory | B32B 3/08 | 211/DIG. 1 |
| 6,044,971 | A | 4/2000 | Esposito et al. | | |
| 6,047,824 | A * | 4/2000 | Winnard | B25H 3/06 | 206/378 |
| 6,168,018 | B1 * | 1/2001 | Ramsey | B25H 3/06 | 206/378 |
| 6,202,864 | B1 * | 3/2001 | Ernst | A47F 7/024 | 206/372 |
| 6,267,277 | B1 * | 7/2001 | Taylor | B25H 3/04 | 224/183 |
| 6,360,884 | B1 * | 3/2002 | Smith | A47K 1/09 | 206/362.1 |
| 6,571,966 | B1 * | 6/2003 | Hsiao | A47F 7/0028 | 206/379 |
| 6,587,022 | B1 * | 7/2003 | Devine | A45F 5/00 | 211/DIG. 1 |
| 6,702,112 | B1 * | 3/2004 | Henderson | B65D 85/20 | 224/904 |
| 6,923,317 | B2 * | 8/2005 | Coleman, Jr. | B25H 3/003 | 206/378 |
| 7,310,035 | B2 * | 12/2007 | Wooten | H01F 7/0252 | 335/302 |
| 7,802,680 | B2 * | 9/2010 | Krebs | B25H 3/04 | 206/349 |
| 7,905,354 | B1 * | 3/2011 | Geibel | B25H 3/06 | 206/378 |
| 8,181,780 | B1 * | 5/2012 | Guffey | B25H 3/06 | 206/378 |
| 8,272,628 | B2 * | 9/2012 | Winnard | B25H 3/06 | 269/6 |
| D687,283 | S | 8/2013 | Robinson | | |
| 8,967,562 | B1 * | 3/2015 | Bileth | F16M 13/022 | 248/311.2 |
| 9,115,969 | B2 * | 8/2015 | Goodwin | F42B 39/26 | |
| 9,126,329 | B2 * | 9/2015 | Kao | F16M 13/022 | |
| 9,243,745 | B1 * | 1/2016 | Hughes | B25H 3/04 | |
| D783,381 | S | 4/2017 | Robinson | | |
| 9,873,195 | B1 * | 1/2018 | Buxton | B25H 3/003 | |
| 10,052,754 | B1 * | 8/2018 | Coleman, Jr | B25H 3/04 | |
| 10,125,542 | B1 * | 11/2018 | Wandschneider | E06C 7/14 | |
| D837,625 | S | 1/2019 | Cacciabeve | | |
| 10,207,401 | B1 * | 2/2019 | Pedrin | B25H 3/003 | |
| 10,413,092 | B2 * | 9/2019 | Winnard | A47F 5/0823 | |
| 10,458,660 | B2 * | 10/2019 | Fleming | A47B 97/00 | |
| D897,802 | S | 10/2020 | Bars | | |
| 10,842,264 | B1 * | 11/2020 | Savryha | A47B 47/0091 | |
| 11,103,989 | B2 | 8/2021 | Hurley | | |
| 11,110,589 | B2 * | 9/2021 | Hurley | H01F 7/0252 | |
| D950,340 | S | 5/2022 | Fassezke | | |
| 11,319,717 | B1 * | 5/2022 | Kukuruda | E04G 21/1841 | |
| D961,351 | S | 8/2022 | Hsieh | | |
| 11,504,843 | B2 * | 11/2022 | Cacciabeve | B25H 3/003 | |
| 11,707,832 | B2 * | 7/2023 | Hurley | B25H 3/06 | 206/373 |
| D1,039,846 | S | 8/2024 | Jiang | | |
| D1,049,659 | S | 11/2024 | Cai | | |
| D1,065,963 | S | 3/2025 | Sherman | | |
| D1,091,279 | S | 9/2025 | Chen | | |
| 2002/0121491 | A1 * | 9/2002 | Ernst | B25H 3/04 | 206/372 |
| 2003/0079580 | A1 * | 5/2003 | Beauchamp | B25F 5/029 | 81/490 |
| 2003/0079581 | A1 * | 5/2003 | Beauchamp | B25F 5/029 | 81/490 |
| 2004/0173484 | A1 * | 9/2004 | Bates | B25H 3/04 | 206/349 |
| 2005/0051446 | A1 | 3/2005 | Chen | | |
| 2006/0015023 | A1 * | 1/2006 | Monfre | A61B 5/14532 | 206/229 |
| 2006/0016841 | A1 * | 1/2006 | Shurm | A45F 5/00 | 224/222 |
| 2006/0234846 | A1 | 10/2006 | Tucker | | |
| 2007/0141885 | A1 | 6/2007 | Chen | | |
| 2009/0166305 | A1 | 7/2009 | Hsieh | | |
| 2009/0218302 | A1 | 9/2009 | Winnard | | |
| 2009/0255891 | A1 | 10/2009 | Lanning | | |
| 2011/0303808 | A1 * | 12/2011 | Bileth | A47G 23/0266 | 248/311.2 |
| 2013/0061561 | A1 * | 3/2013 | Johnson | B65D 21/0209 | 53/449 |
| 2013/0068709 | A1 * | 3/2013 | Liu | B25H 3/04 | 211/70.6 |
| 2013/0180938 | A1 * | 7/2013 | McDonald | A47G 21/14 | 211/70.6 |
| 2015/0122750 | A1 * | 5/2015 | Kao | B25H 3/003 | 211/13.1 |
| 2016/0121478 | A1 * | 5/2016 | Schein | B25H 3/06 | 206/350 |
| 2016/0243695 | A1 * | 8/2016 | Billups, Jr. | B25H 3/003 | |
| 2017/0173776 | A1 * | 6/2017 | Ernst | B25H 3/04 | |
| 2017/0190046 | A1 | 7/2017 | Winnard | | |
| 2017/0341218 | A1 | 11/2017 | Maruzzo et al. | | |
| 2018/0104812 | A1 * | 4/2018 | Wacker | F16B 1/00 | |
| 2018/0361563 | A1 | 12/2018 | Hurley | | |
| 2019/0061139 | A1 * | 2/2019 | Kao | B65D 25/101 | |
| 2019/0070723 | A1 * | 3/2019 | Billups, Jr. | B25H 3/003 | |
| 2019/0084146 | A1 * | 3/2019 | Boltryk | B25H 3/003 | |
| 2019/0283233 | A1 * | 9/2019 | Kukucka | B25H 3/06 | |
| 2020/0094396 | A1 * | 3/2020 | Steiner | B25H 3/003 | |
| 2020/0122315 | A1 * | 4/2020 | Hurley | B25H 3/04 | |
| 2020/0180138 | A1 * | 6/2020 | D'Alessandro | B25H 3/00 | |
| 2020/0238501 | A1 * | 7/2020 | Baum | B25H 3/003 | |
| 2020/0306950 | A1 * | 10/2020 | Chang | B25H 3/04 | |
| 2021/0039245 | A1 * | 2/2021 | Kukucka | B25H 3/003 | |
| 2021/0387324 | A1 | 12/2021 | Hurley | | |
| 2022/0071361 | A1 * | 3/2022 | Ernst | A45C 13/02 | |
| 2022/0080576 | A1 * | 3/2022 | Chen | B25H 3/003 | |
| 2022/0176543 | A1 * | 6/2022 | Hurley | B25H 3/06 | |
| 2022/0347833 | A1 * | 11/2022 | Hurley | B25H 3/04 | |
| 2022/0361652 | A1 * | 11/2022 | Stutz | A44B 99/00 | |
| 2022/0379460 | A1 * | 12/2022 | Wong | B25H 3/003 | |
| 2023/0013699 | A1 * | 1/2023 | Cacciabeve | B25H 3/04 | |
| 2023/0158660 | A1 * | 5/2023 | Schneider | B25H 3/04 | 211/70.6 |

* cited by examiner

TOOL ORGANIZER

CROSS-REFERENCE TO RELATED APPLICATIONS

This application claims benefit of U.S. provisional patent application Ser. No. 63/460,443 filed Apr. 19, 2023, entitled TOOL ORGANIZER, the disclosure of which is incorporated herein by reference.

BACKGROUND

This disclosure relates to organizers for tools.

Hand tools, such as wrenches, pliers, screwdrivers, and the like are typically kept in tool chest, stored for access when the tools are to be used. These tool chests may have one or more drawers which the tools can be stored in. However, the tools can become disorganized when simply put into the chest, and it is desirable to keep them in some sort of order, especially in the case of sized tools.

Some tool chests provide pre-defined slots or channels to hold tools, but each owner may have a differing set of tools and sizes thereof, so the pre-defined chest organizers may not work well for any individual user.

Plus, with different tools having different dimensions, for example in the case of wrenches, where the smallest dimension wrenches are thinner than larger dimension wrenches, existing organizing dividers do not allow for a uniform alignment of the tools for a more professional appearance.

SUMMARY

In accordance with the disclosure, a modular tool organizer is provided that allows a user to construct an organizer with spaces for a particular number of tools. The organizer accommodates different sizes of tools while maintaining them in consistent alignment relative to one another.

The subject matter of the present technology is particularly pointed out and distinctly claimed in the concluding portion of this specification. However, both the organization and method of operation, together with further advantages and embodiments thereof, may best be understood by reference to the following description taken in connection with accompanying drawings wherein like reference characters refer to like elements.

DETAILED DESCRIPTION

The system according to a preferred embodiment of the present disclosure comprises a device for organizing tools.

Figure 1A:
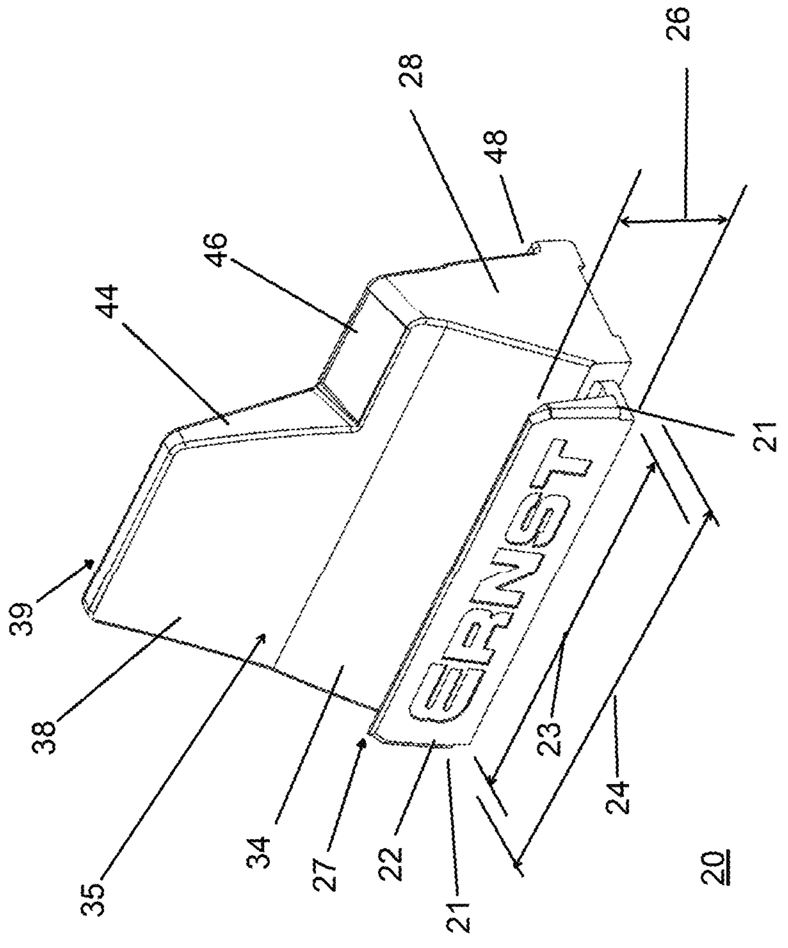
FIG. 1A is a front perspective view of a single channel tool organizer in accordance with the disclosure.

Referring to FIG. 1A, a front perspective view of a single channel tool organizer in accordance with the disclosure, the tool organizer 20 comprises a body having a front tab 22 extending a width 23 slightly less than the width 24 of the body and having a vertical height 26, the height defining a first upper region 27. The left and right lower edges of the tab have inward step portions 21 defined as a part thereof. The bottom portion of the tab is a small distance 25 (FIG. 2) above the base level of the organizer. A rear body portion 28 is set a distance 30 (FIG. 2) back from the rear side of the front tab, defining a channel 32 between a first wall 33 defined by the front tab and a second wall 35 defined by the rear body. The rear body second wall extends upwardly in a first portion 34 having a curved profile that extends to an inflection line 36, at which a further upwardly extending portion 38 is provided, having a second curved profile, the top extent of portion 38 defining a second upper region 39. The lower curve profile of portion 34 is concave down with respect to the front of the tool organizer, while the second curved profile of portion 38 is concave up with respect towards the front of the body. In the orientation of FIG. 1A, the left most portion of the rear body extends a vertical height 40 (FIG. 2), but moving towards the right, extends downwardly to a height 42 (FIG. 2) in a angled region 44, providing a forwardly angled shelf portion 46 at the right most edge of the body. The rear body portion 28 has a somewhat trapezoidal shape, being wider at the base and tapering narrower as it extends upwardly. The front tab width 24 is slightly less than the width of body portion 28, being inwardly offset slightly at both sides of the tab.

Figure 1B:
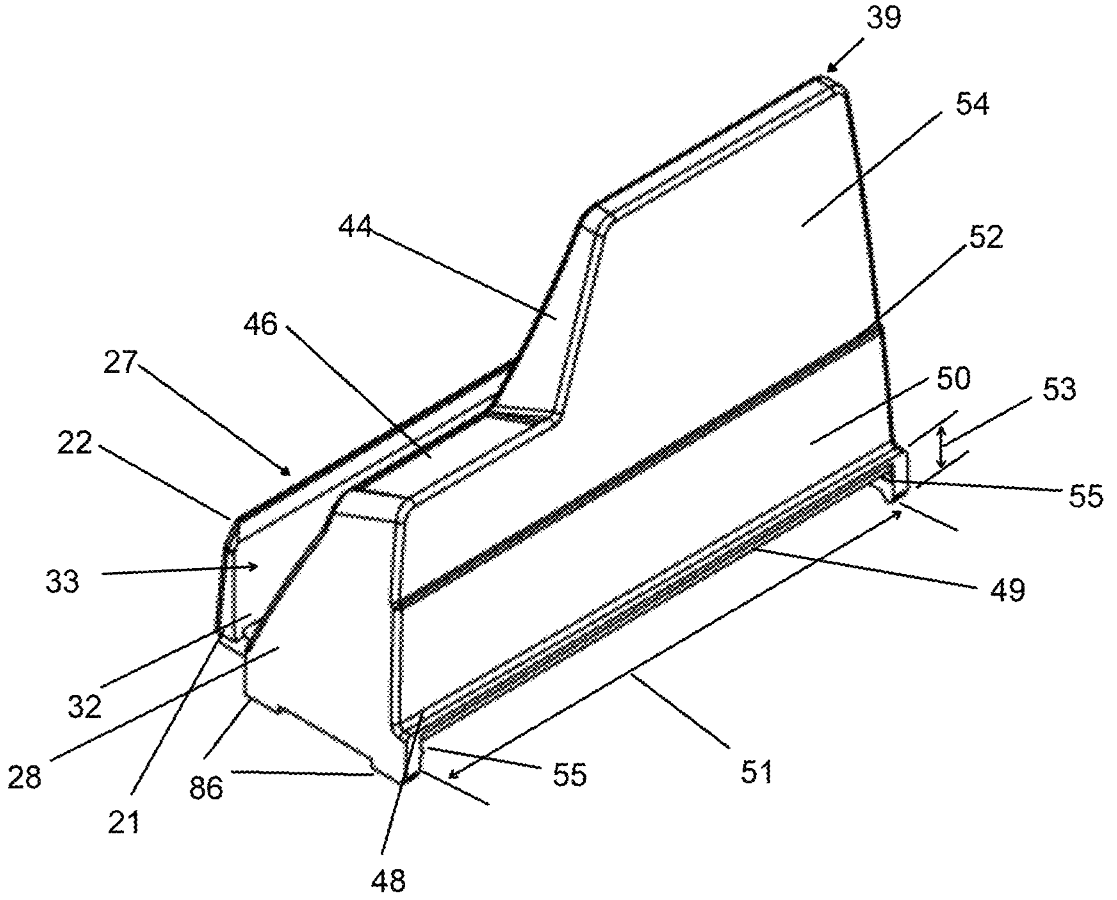
FIG. 1B is a rear perspective view of the tool organizer of FIG. 1A.
Figure 2:
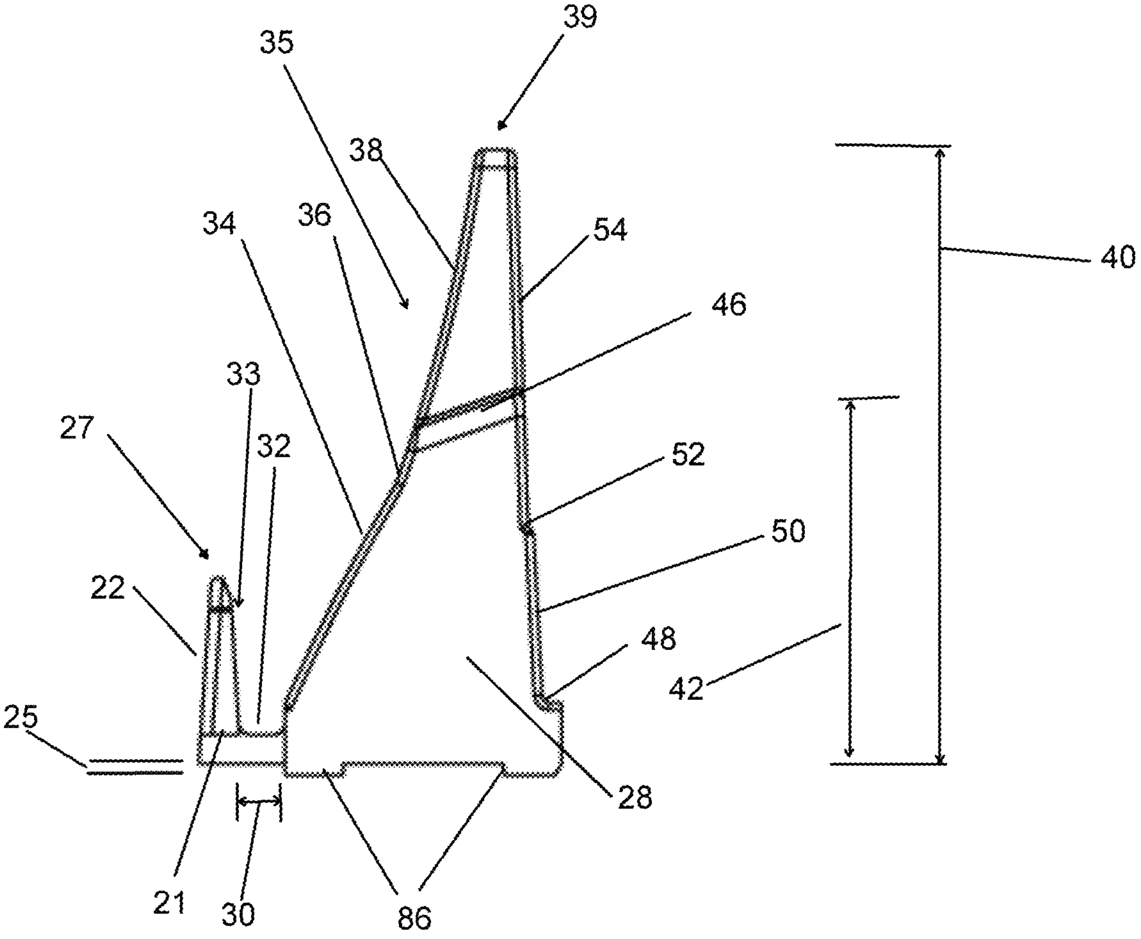
FIG. 2 is a side view of the tool organizer of FIG. 1A.
Figure 3:
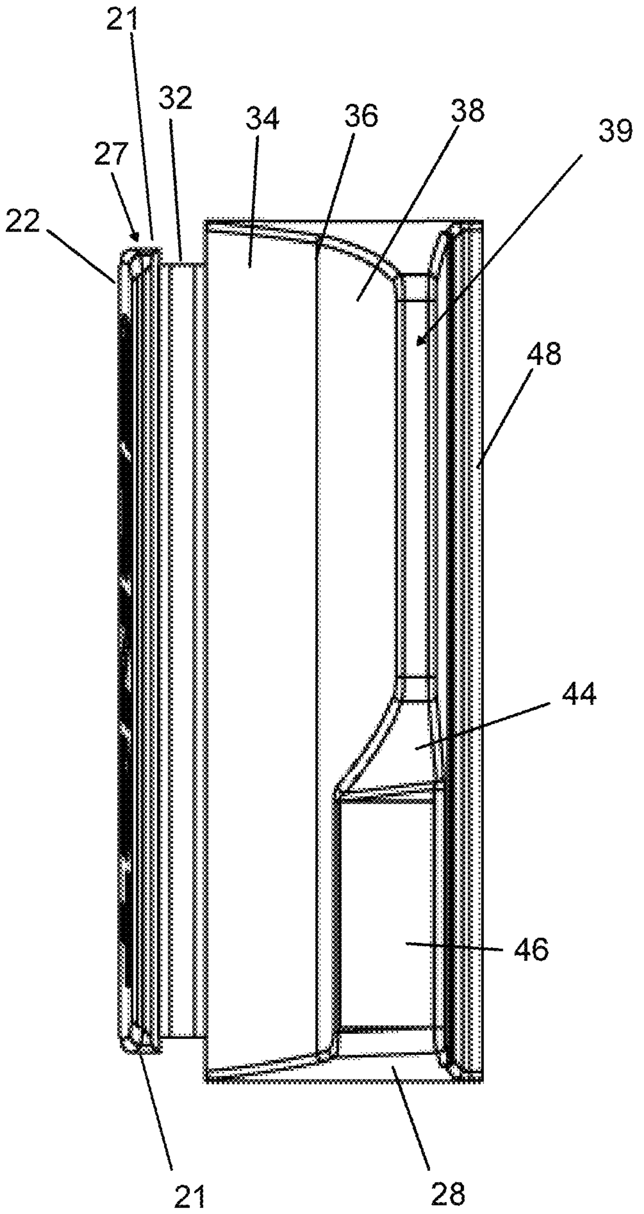
FIG. 3 is a top view of the tool organizer of FIG. 1A.
Figure 4:
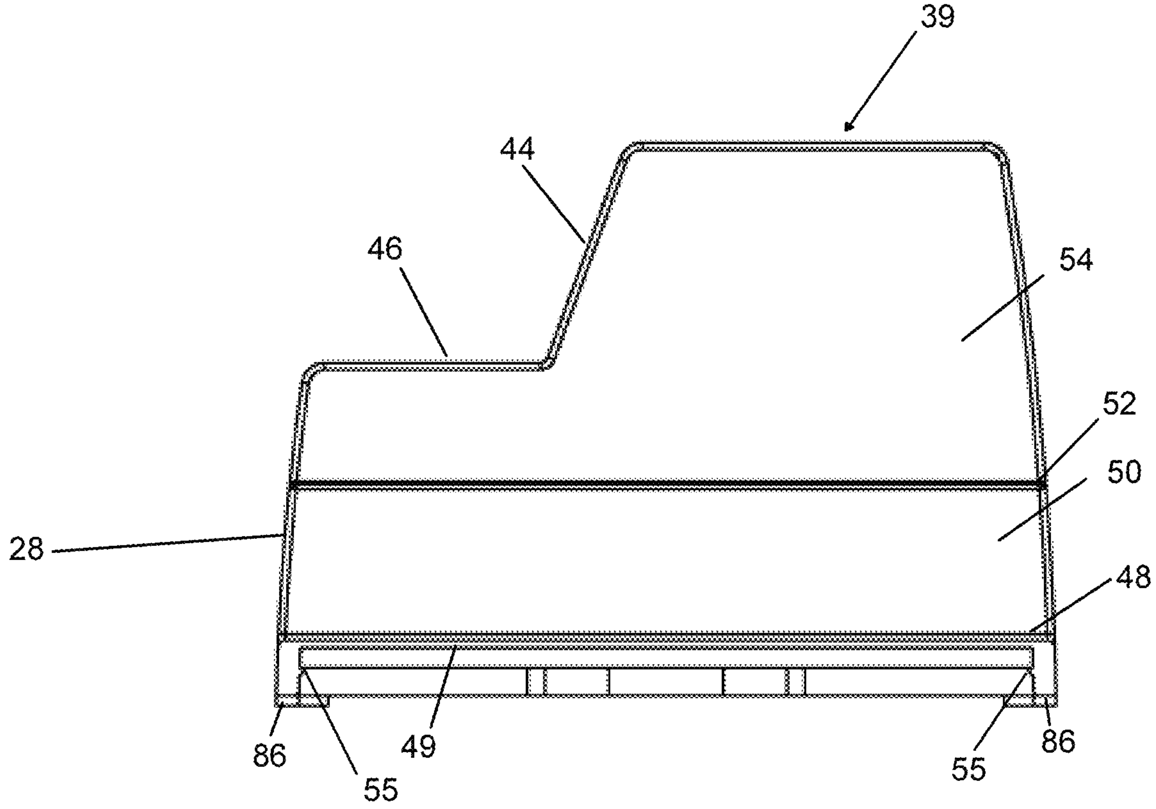
FIG. 4 is a rear view of the tool organizer of FIG. 1A.

Referring to FIG. 1B, a rear perspective view of the organizer of FIG. 1A, and FIG. 2, a side view thereof, at the rear of the organizer an inward step towards the front is defined, resulting in a lower rear tab portion 48 at the bottommost extent of the organizer. At the top edge of the tab 48, a step inward toward the front of the organizer is defined, and an angled upward extent 50 is provided extending upwardly to somewhat less than ⅓ the height of the organizer, to a second slight inward step point 52, and continuing upward with portion 54, both portions 50 and 54 at an angle toward the front of the organizer, with a substantially straight line profile.

The left and right upper edges of front tab 22, portions 38, 44 and 46 are chamfered.

Figure 5:
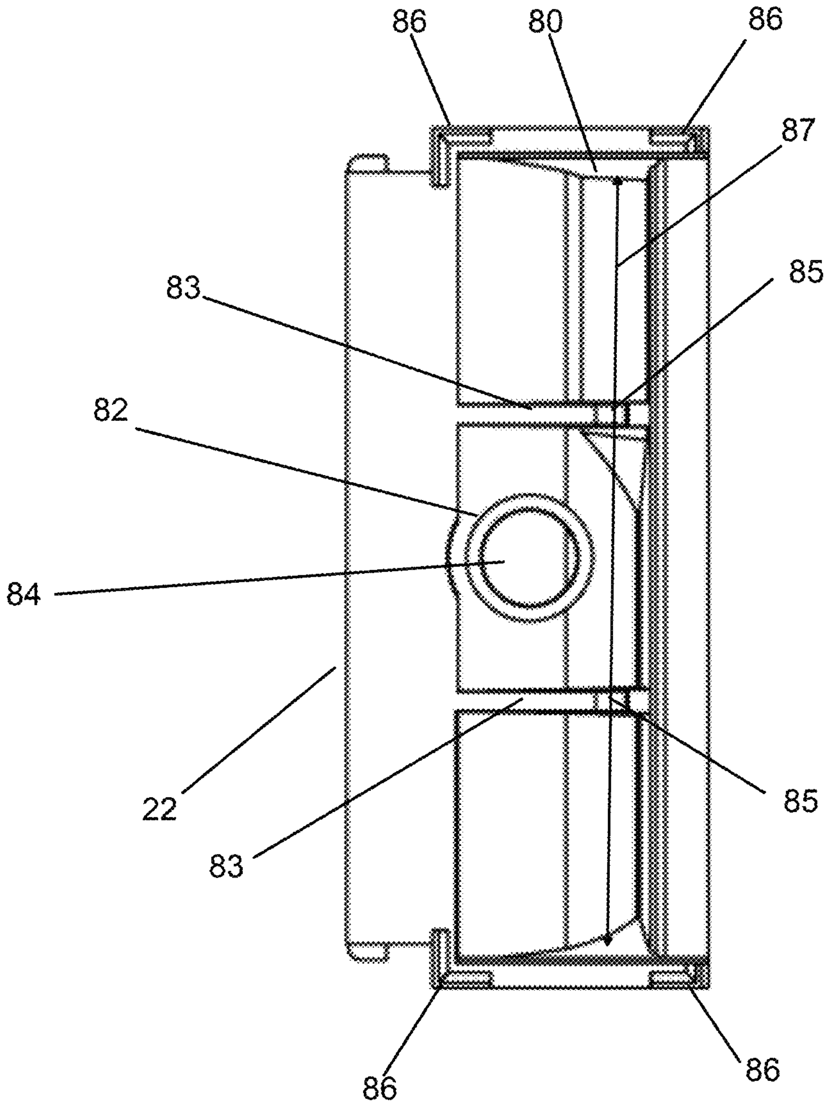
FIG. 5 is a bottom view of the tool organizer of FIG. 1A.

The rear body portion 28 is substantially hollow in its interior portion 80 (FIG. 5) toward the rear of the rear body, and a receiving portion 82 is defined centrally, for securing a magnet 84 therein. Structural ribs 83 extending from the front to the back of the organizer at the bottom thereof have receiving slots 85 defined therein, extending upwardly in the interior of the organizer a sufficient distance allowing access to a broad receiving slot region 87 provided in the interior to accommodate the height of a tab member 22 therein, as discussed below. Below the tab portions 48 of the organizer, at the rear of the organizer, an open area 49 is formed of width 51 and vertical height 53. At a lower position of the edges of the open area, left and right ridges 55 are formed. The bottom of the rear body has four right angle cleats 86 formed thereon, one per corner. The cleats raise the body above the surface on which the body is placed.

The frontward presenting face of front tab 22 may carry a graphic element, such as branding, the ERNST @ brand of Ernst Manufacturing, Inc., of Sandy, Oregon US being shown in the illustration.

In use, the organizer is placed on a substantially flat surface, such as a drawer in a tool chest, and a hand tool, such as a wrench, is placed in the channel 32, whereby the tool is maintained in position, but available for easy access by a user. The tool drawer is likely metal in most cases, and the magnet 84 assists in the organizer staying in place, but still allowing easy re-positioning of the organizer, if desired. The tool drawer may employ a drawer liner, and the cleats 86 bite into the drawer liner to help keep the tool organizer from unintentionally sliding. The cleats also ensure that all the corners of the organizer touch the tool drawer surface in case there is any warp or unevenness in the shape of the organizer.

The organizer is designed as a modular piece, which may be assembled together with other pieces, to construct an organizer set to accommodate multiple tools in an organized fashion. To accomplish this, in addition to the organizer module of FIG. 1A, which has one tool receiving channel 32, a multi-tool receiving organizer module 60 is provided, illustrated in FIGS. 6A, 6B and 7-10, having three tool receiving channels.

Figure 6A:
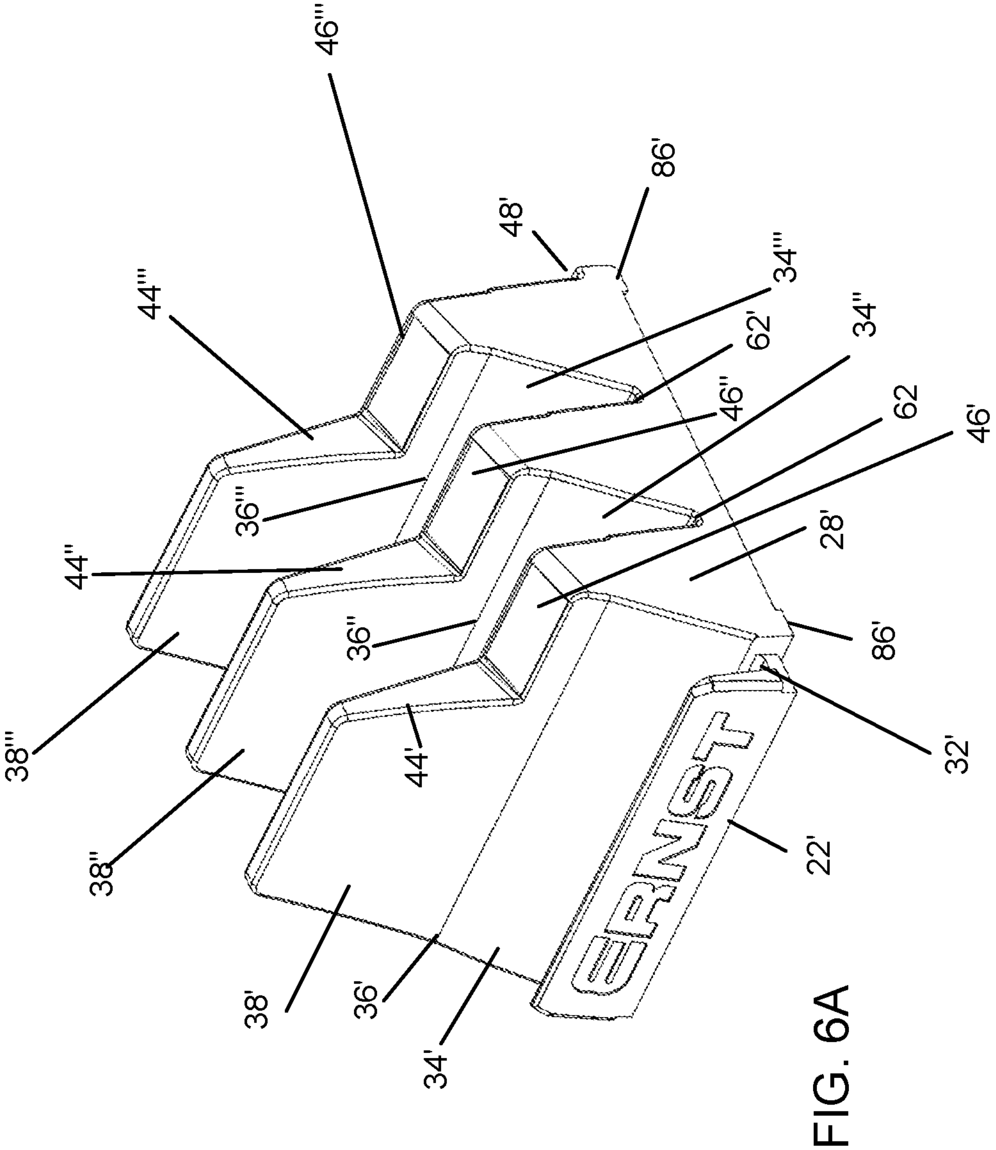
FIG. 6A is a front perspective view of a multi channel tool organizer in accordance with the disclosure.
Figure 6B:
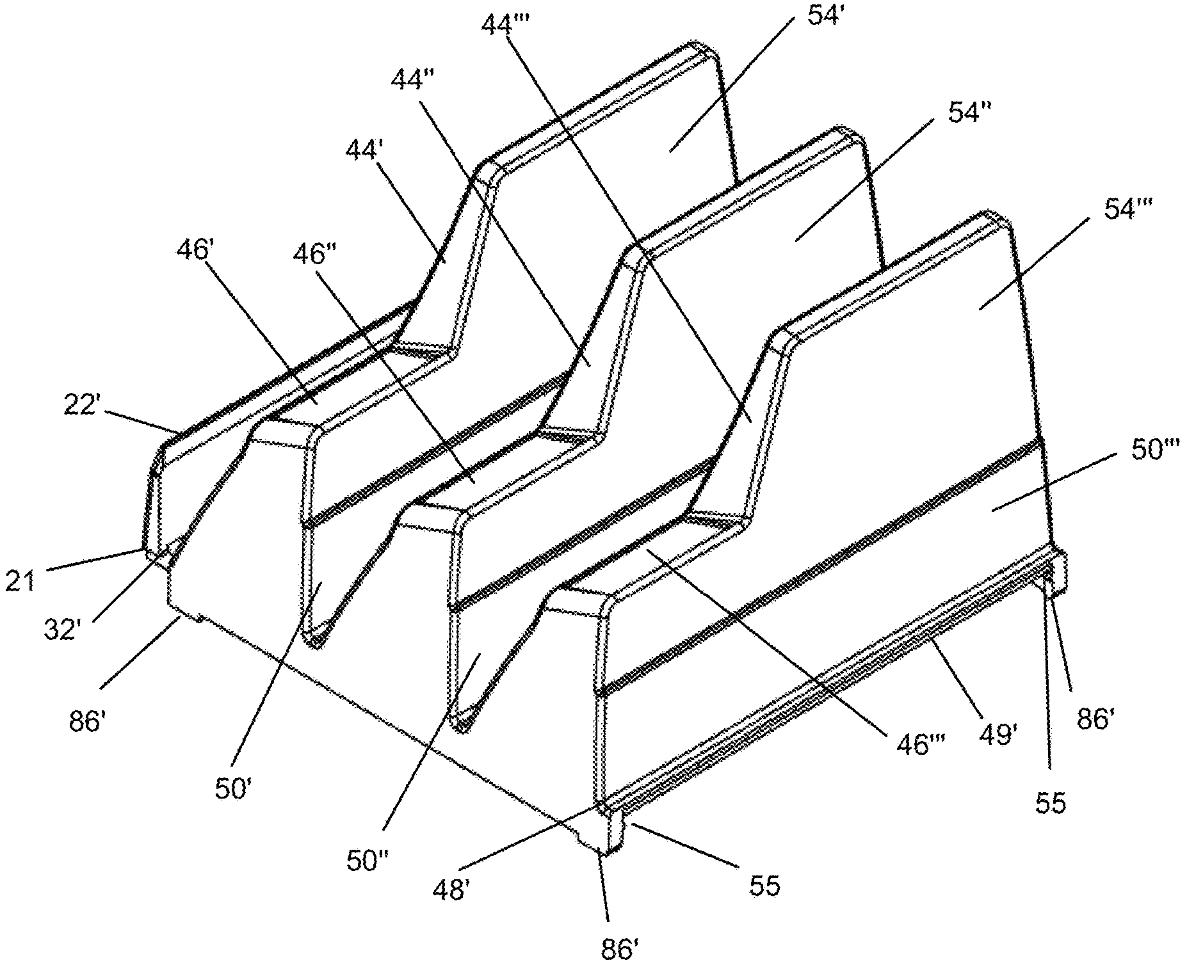
FIG. 6B is a rear perspective view of the multi-channel tool organizer of FIG. 6A.
Figure 7:
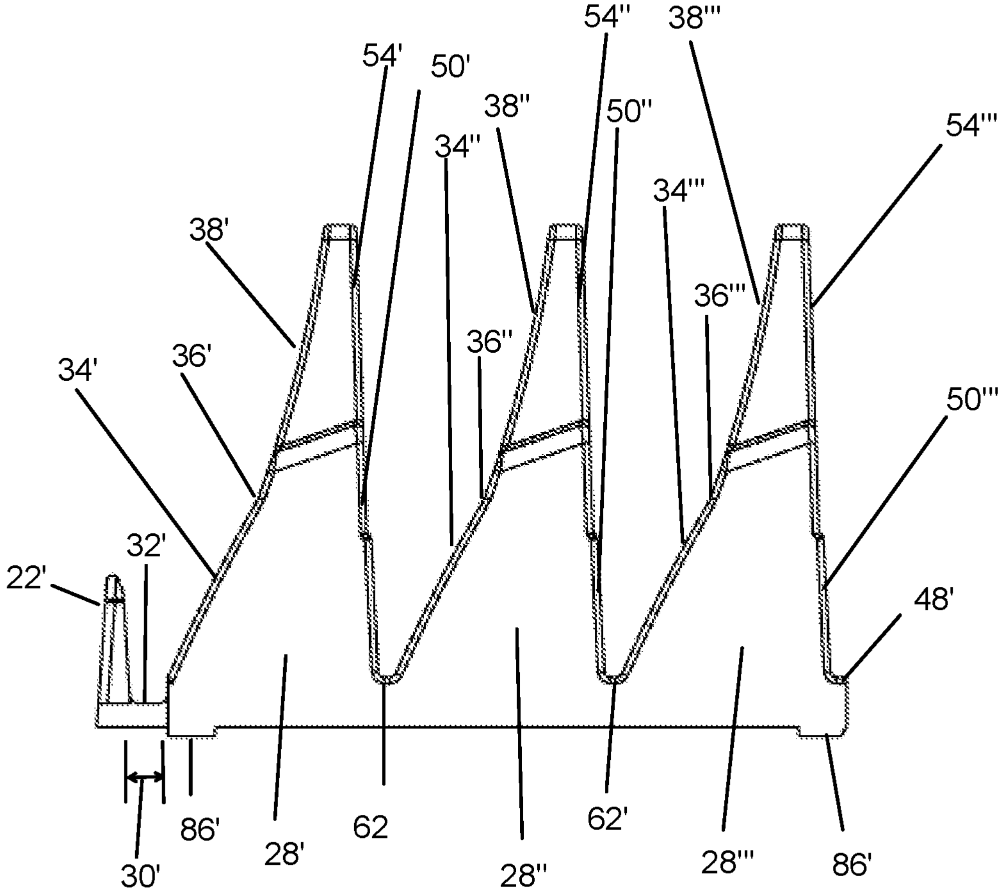
FIG. 7 is a side view of the tool organizer of FIG. 6A.
Figure 8:
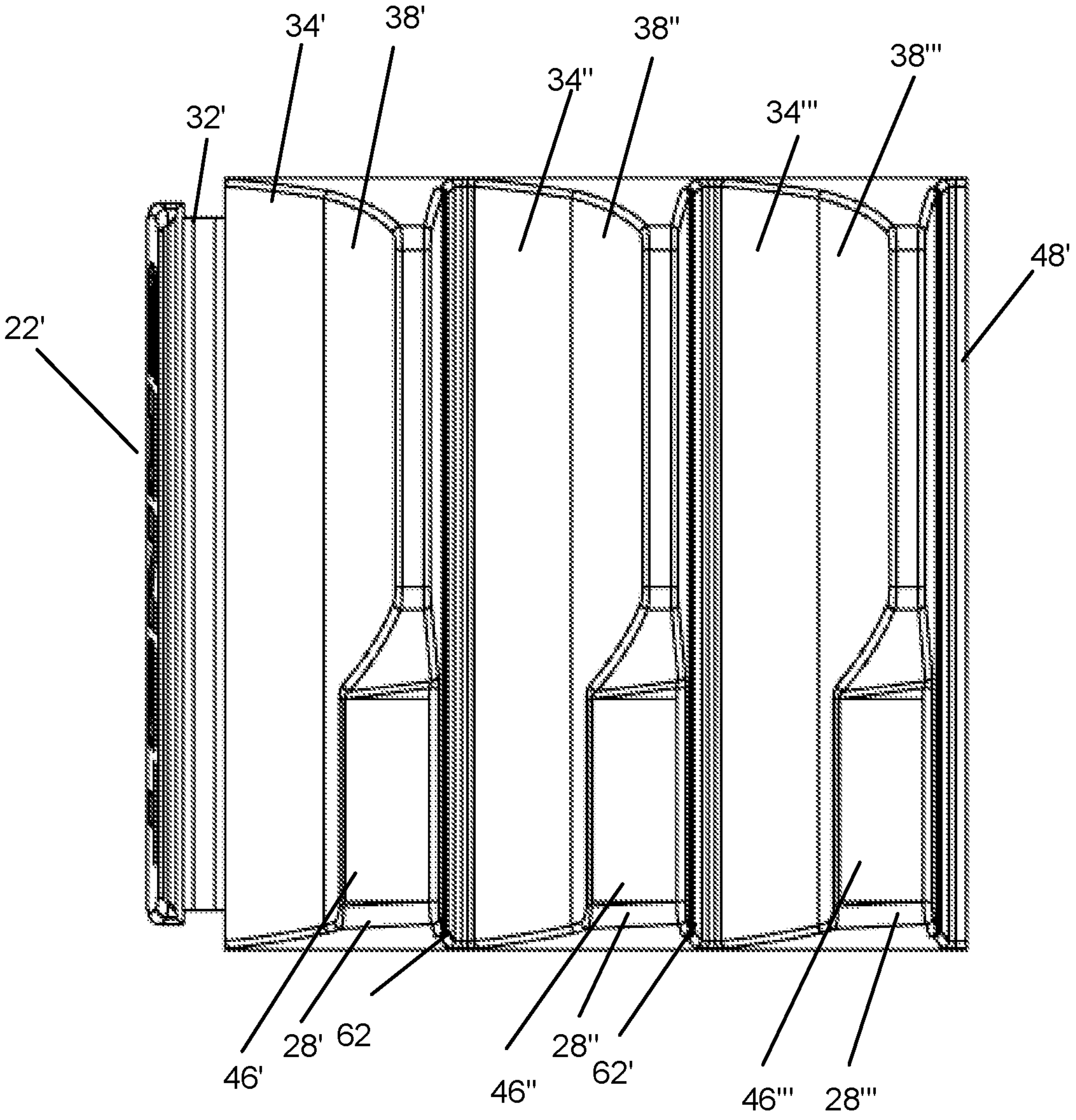
FIG. 8 is a top view of the tool organizer of FIG. 6A.
Figure 9:
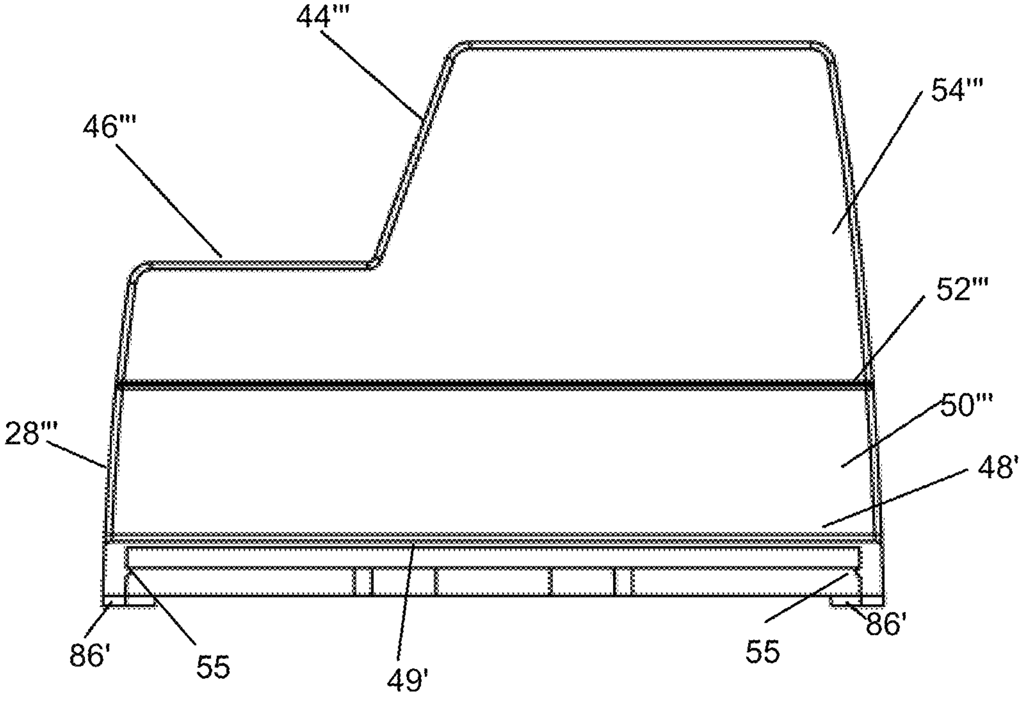
FIG. 9 is a rear view of the tool organizer of FIG. 6A.
Figure 10:
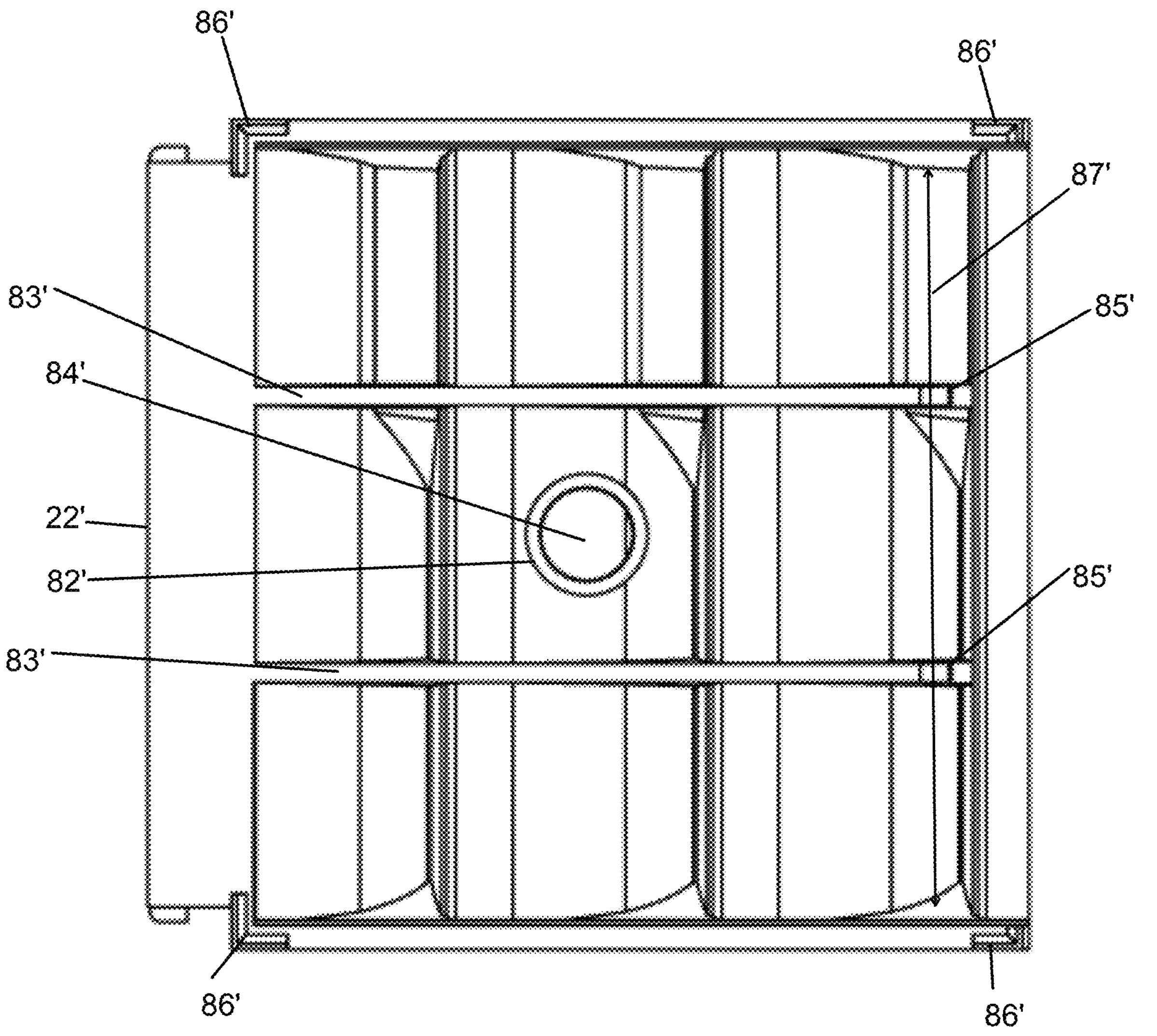
FIG. 10 is a bottom view of the tool organizer of FIG. 6A.

Referring to FIG. 6A, a front perspective view of a multi channel tool organizer in accordance with the disclosure, organizer 60 comprises a body with corresponding features to organizer 20, but with modification. The multichannel organizer has a front tab 22', with tool receiving channel 32' defined between tab 22' and a rear body portion 28' set a distance 30' back from the front tab, defining the channel 32' between the front tab and rear body. In a manner corresponding to organizer 20, the rear body extends upwardly in a first portion 34' having a curved profile that extends to an inflection line 36', at which a further upwardly extending portion 38' is provided, having a second curved profile.

For organizer 60, at the back of rear body portion 28', a second tool receiving channel 62 is provided between rear body portion 28' and a second rear body portion 28'', which has features corresponding to those of body 28' (and body 28 of organizer 20), including an angled upward extent 50'' extending upwardly to somewhat less than ⅓ the height of the organizer, to a second slight inward step point 52'', and continuing upward with portion 54'', both portions 50'' and 54'' at an angle toward the front of the organizer.

At the back of body 28', a further tool receiving channel 62' is defined between body portion 28'' and a third body portion 28'''. The rear of body portion 28''' corresponds to the rear of body 28 of organizer 20, having an inward step towards the front defined, resulting in a lower rear tab portion 48' at the bottommost extent of the organizer. At the top edge of the tab 48', a step inward toward the front of the organizer is defined, and an angled upward extent 50''' is provided extending upwardly to somewhat less than ⅓ the height of the organizer, to a second slight inward step point 52''', and continuing upward with portion 54''', both portions 50''' and 54''' at an angle toward the front of the organizer.

The left and right upper edges of front tab 22', portions 38', 44' and 46 are chamfered.

The rear body portions 28', 28'' and 28''' are substantially hollow in their interior portions (FIG. 10) toward the rear of the rear body, and a receiving portion 82' is defined centrally, for securing a magnet 84' therein. First and second structural ribs 83' extending from the front to the back of the organizer at the bottom thereof have receiving slots 85' defined therein, extending upwardly in the interior of the organizer a sufficient distance allowing access to a broad receiving slot region 87' provided in the interior to accommodate the height of a tab member 22' therein, as discussed below.

The tool organizers 20 and 60 are modular pieces that can be assembled to build a tool organizer having a number of tool receiving portions to accommodate a desired number of tools, so the organizer can be customized to fit the needs of individual users.

Figure 11:
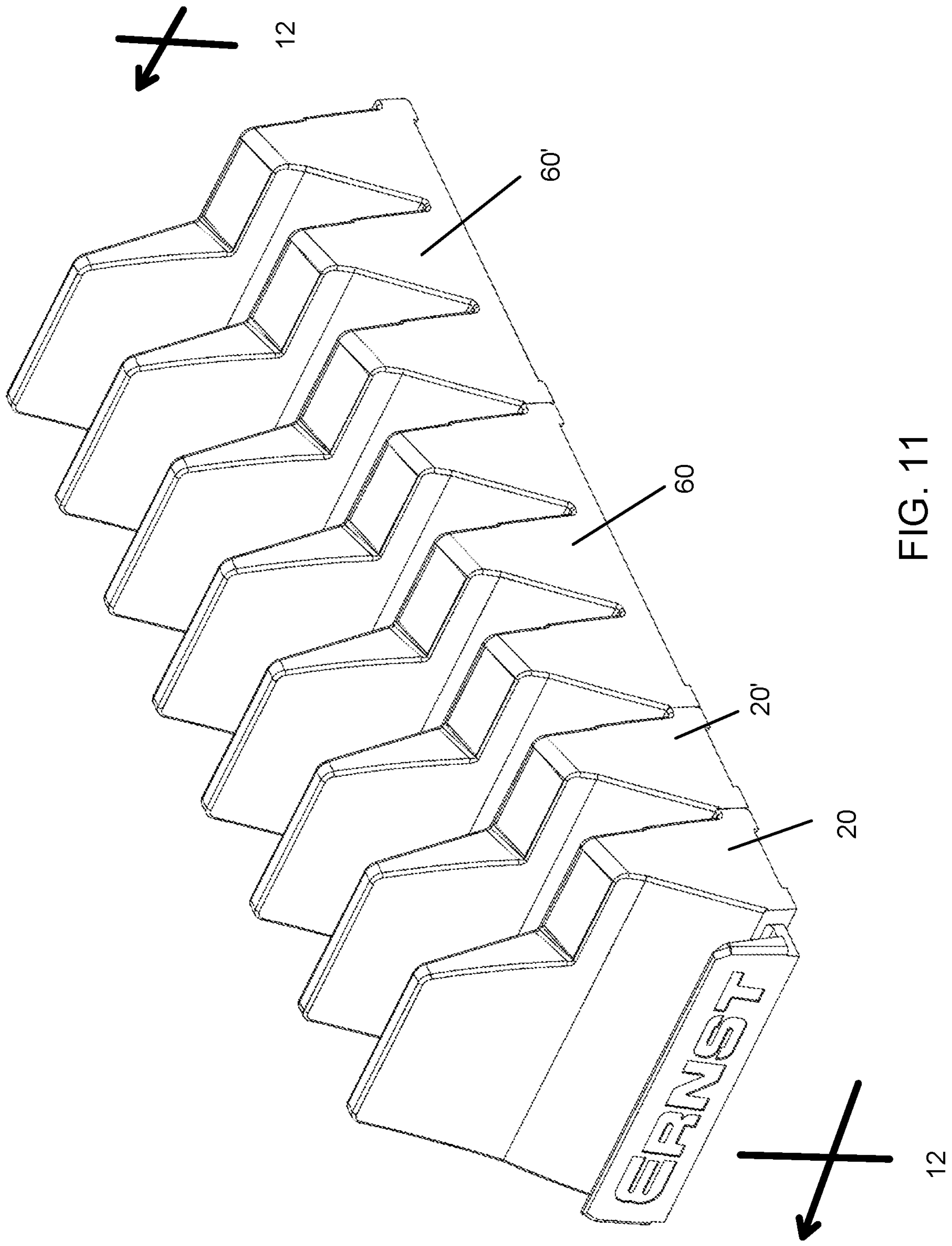
FIG. 11 is a view of plural tool organizers in accordance with the disclosure, assembled into a group for receiving multiple tools.

Referring to FIG. 11 a perspective view of plural tool organizers assembled together in accordance with the disclosure, in this view, two organizers 20, 20' are connected with two organizers 60, 60', providing a composite organizer with eight tool receiving bays.

To assemble a group of organizers, two organizers snap together, with the tab 22/22' of a back organizer 20 (or 60) fitting into the space defined at the rear of the front organizer, with the tab fitting into the receiving slots 85/85' in the interior of the front organizer. The open area 49 is of such size so that tab 22/22' fits up into the slots 85/85' providing a snug engagement between the front and rear organizer. The fit of the tab into the receiving slots as well as the weight of the rear organizer helps to maintaining the engagement between any two assembled organizers.

Figure 12:
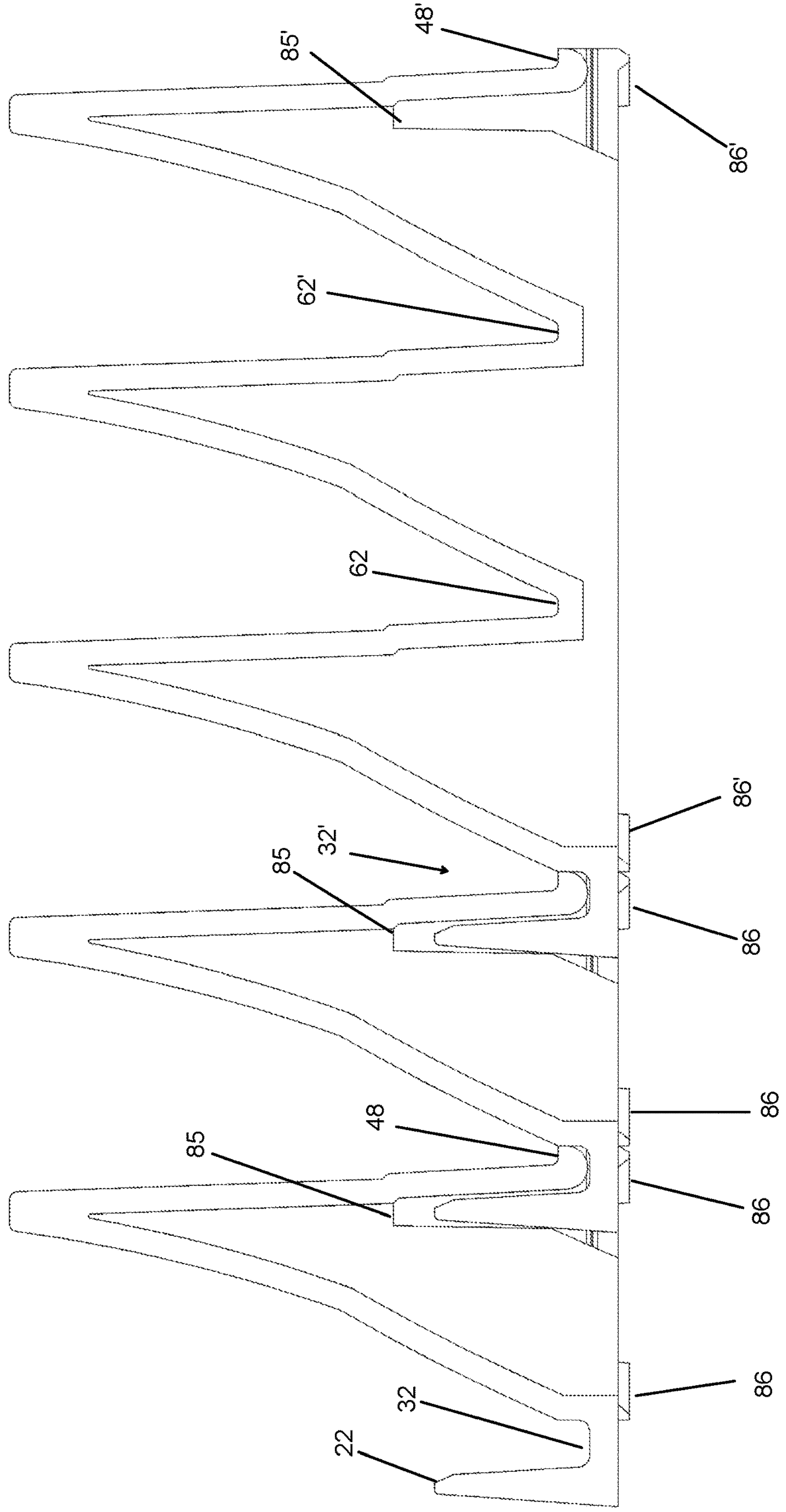
FIG. 12 is a sectional view taken along line 12-12 of FIG. 11.
Figure 13:
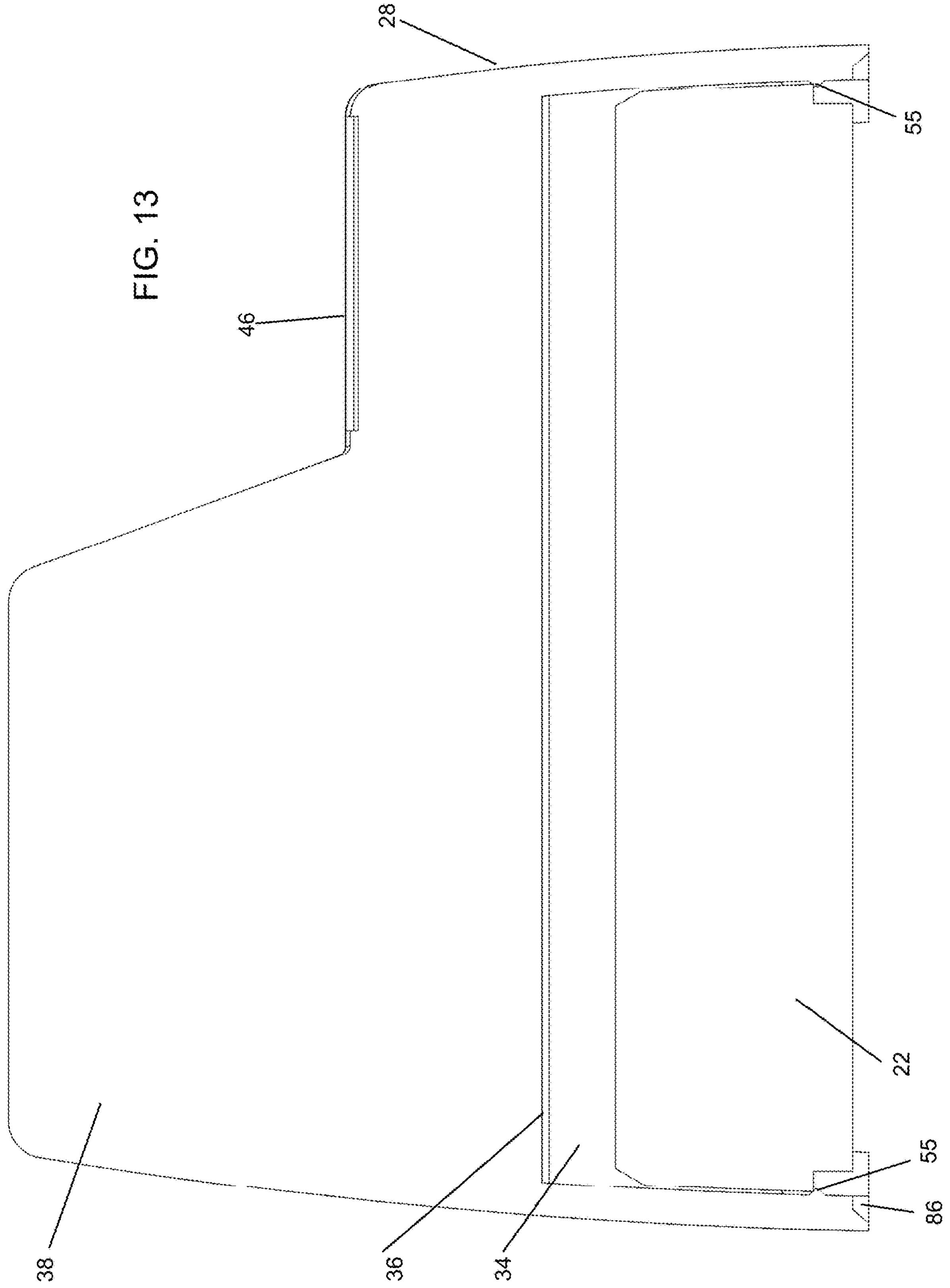
FIG. 13 is front view of the tool organizer of FIG. 1.

FIG. 12 is a sectional view taken along line 12-12 of FIG. 11 illustrating the fit between organizers when assembled together, wherein the tab 22 of back organizer 20 fits into the space at the rear of front organizer 20 and the edge at the top of opening 49 at the rear of the front organizer rest on the bottom of channel 32 of the organizer 20' behind the front organizer. In corresponding fashion, organizers 60 may be added to the set, forming a multiple tool organizing structure (one such organizer 60 is shown in FIG. 12, the rearmost organizer is omitted in this view). The different organizers 20, 60 may be combined together in any desired fashion to provide a composite organizer with sufficient tool receiving channels to accommodate an individual need or preference. For example, and organizer 20 may be placed in front of an organizer 60, with another organizer 20 behind the organizer 60, or a 60/60/20 combination, or any other mix as desired. The portion 48 fits within the channel 32/32' of the organizer behind the more frontward organizer and provides a smooth transition to help define the tool receiving channel defined between any two assembled organizers. As may be observed in FIGS. 11 and 12, the snapping together of the organizers 20 and/or 60 provides a uniform spacing and configuration for the tool receiving channels provided.

Figure 14:
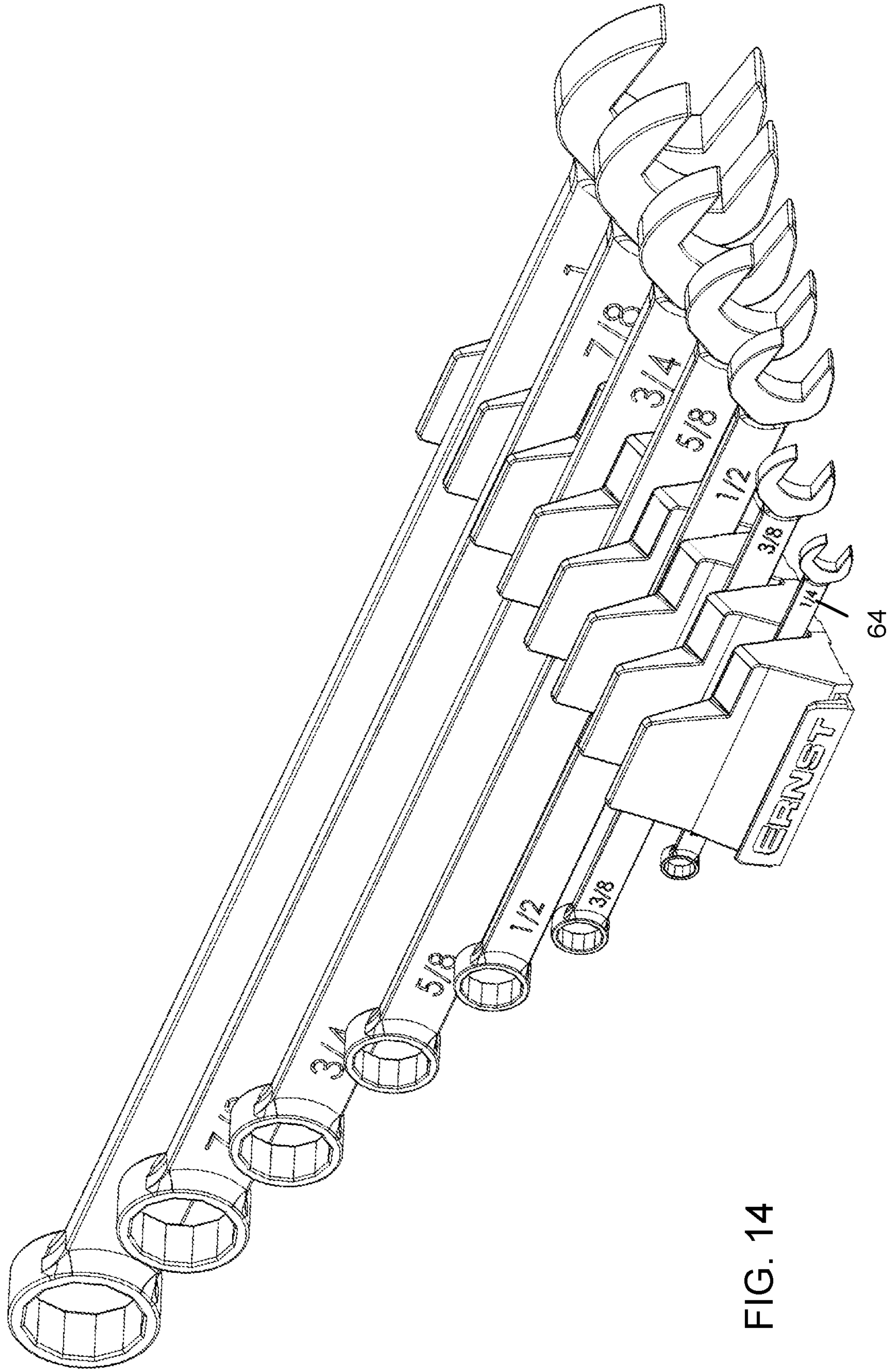
FIG. 14 is a perspective view of an assembled group of tool organizers with wrenches installed therein.
Figure 15:
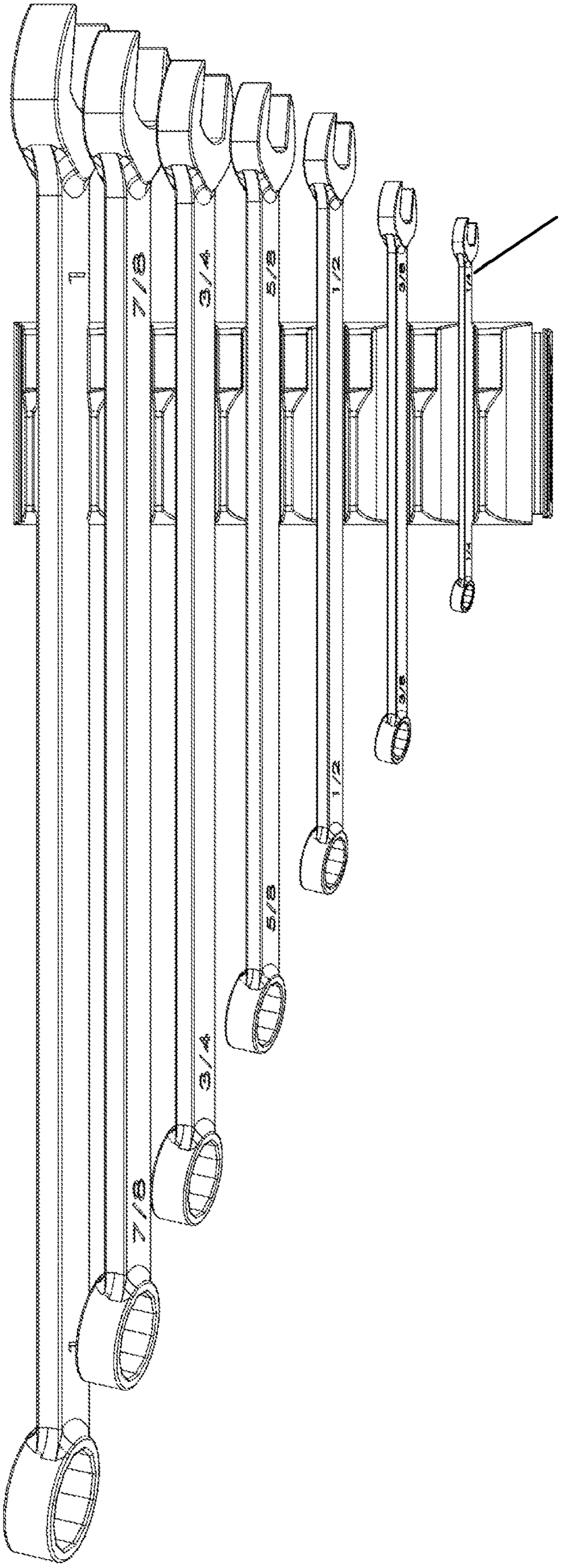
FIG. 15 is a top view of the configuration of FIG. 14.

FIGS. 14 and 15 are perspective and top views of an assembled group of tool organizers as in FIG. 11, with seven wrenches 64 installed therein.

The curved profile portions 34 and 38 and inflection therebetween provide an advantageous effect in that the organizer accommodates different tool sizes, while enabling the tools, wrenches in the illustration, to be positioned with a forward tilt angle for maintaining them in a consistent orientation, such that a uniform aesthetic appearance is provided even when the tools have different thicknesses, such as in the illustrated examples where the ¼ inch wrench is significantly thinner than the 1 inch wrench and the other wrenches, such that various wrenches would seat somewhat non-uniformly if the curved profiles were absent. With the configuration of the present organizer, the wrenches are easily aligned to a consistent appearance.

The forwardly angled shelf region 46 may be used to have labels, for example to indicate particular sizes of tools that are to be placed into particular positions in the organizer.

In accordance with the disclosure, a tool organizer is provided that allows customization of the number of tools to be accommodated, providing a uniform presentation of varying sized tools.

While a preferred embodiment of the technology has been shown and described, it will be apparent to those skilled in the art that many changes and modifications may be made without departing from the broader aspects. The appended claims are therefore intended to cover all such changes and modifications as fall within the true spirit and scope of the technology.

What is claimed is:

1. A tool organizer system for holding tools, comprising:

a first tool organizer coupled to a second corresponding tool organizer, each of said first tool organizer and said second tool organizer comprising:

a base member having a tool receiver channel defined therein, said base member including a tab and a tab receiving slot, the tab located at a front side of the base member and extending vertically therefrom, and the tab receiving slot located proximal to a rear side of the base member and accessible from a bottom side, wherein the tab receiving slot includes a ridge at left and right edges thereof, said tool receiver channel having a first wall extending from a lower region to a first upper region along a rear face of the tab, and a second wall spaced away from said first wall extending from the lower region to a second upper region, wherein said second wall has a multi-sloped profile for providing a surface for abutting a portion of a face of a tool when the tool is placed for holding in the tool receiver channel, wherein said tab receiving slot is configured to receive a corresponding tab of another tool organizer thereby coupling multiple base members joined in series to form a composite organizer with a combined set of tool receiver channels; and the first and second tool organizers are configured to collectively provide the combined set of tool receiver channels from base members of said first and second tool organizers by insertion of the tab of one of the first or second tool organizers into the tab receiving slot of the other one of the second or first tool organizers.

2. The tool organizer system for holding tools according to claim 1, wherein the tool comprises a wrench and the portion of the face of the tool comprises a shaft of the wrench.

3. The tool organizer system for holding tools according to claim 1, wherein the surface for abutting the portion of the face comprises a first surface for abutting a first portion of a first face, and wherein said first wall provides a second surface for abutting a second portion of a second face of the tool, opposite the first face, when the tool is placed for holding in the tool receiver channel.

4. The tool organizer system for holding tools according to claim 1, said first tool organizer and said second tool organizer further comprising a forwardly angled shelf portion for displaying a tool marker atop a lowered section of the multi-sloped profile.

5. The tool organizer system for holding tools according to claim 1, said first tool organizer and said second tool organizer further comprising one or more cleats formed at a base thereof for biting into a surface on which said first tool organizer and said second tool organizer are installed to reduce unintentional sliding of the tool organizer.

6. The tool organizer system for holding tools according to claim 1, wherein said first tool organizer and said second tool organizer provide a uniform spacing and configuration for holding tools when joined.

7. The tool organizer system for holding tools according to claim 1, wherein the tool comprises first and second tools, and said tools comprise wrenches and the portion of the face of the tool comprise shafts of the wrenches.

8. The tool organizer system for holding tools according to claim 1, wherein one base member has a single tool receiver channel and the second base member has multiple tool receiver channels.

9. The tool organizer system for holding tools according to claim 1, wherein each base member has multiple tool receiver channels.

10. The tool organizer system for holding tools according to claim 1, wherein said multi-sloped profile comprises at least two pitches, with a lower portion having a first pitch and an upper portion having a steeper pitch thereby providing that an overall length of the tool organizer that is more compact.

11. The tool organizer system for holding tools according to claim 1 further comprising a magnet receiving portion in at least one of said base members.

12. The tool organizer system for holding tools according to claim 11 further comprising at least one magnet installed in the magnet receiving portion for assisting the organizer staying in place relative to a metal base.

13. The tool organizer system for holding tools according to claim 1, wherein when the tab of one of the first or second tool organizers into the tab receiving slot of the other one of the second or first tool organizers, a rear face of the tab of the one organizer slides and is seated against an interior face of the receiving slot of the other organizer to conceal the tab of the one organizer.

* * * * *